United States Patent
Sakamoto

(10) Patent No.: US 6,922,299 B2
(45) Date of Patent: Jul. 26, 2005

(54) POWER SAVING METHOD AND APPARATUS FOR DRIVING A SPINDLE MOTOR AND VOICE COIL MOTOR IN A DISK DRIVE

(75) Inventor: Nobuyuki Sakamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 10/346,089

(22) Filed: Jan. 17, 2003

(65) Prior Publication Data

US 2003/0174428 A1 Sep. 18, 2003

(30) Foreign Application Priority Data

Mar. 12, 2002 (JP) ........................................ 2002-067304

(51) Int. Cl.$^7$ .............................................. G11B 15/18
(52) U.S. Cl. ............................................................. 360/69
(58) Field of Search ........................... 360/69, 75, 72.1, 360/73.03, 70, 73.01, 73.06, 77.02, 78.04, 78.06, 78.11, 78.13, 99.09, 272, 281, 281.7

(56) References Cited

U.S. PATENT DOCUMENTS

| | | | | |
|---|---|---|---|---|
| 5,250,883 A | * | 10/1993 | Okada | 318/494 |
| 5,262,705 A | * | 11/1993 | Hattori | 318/479 |

(Continued)

FOREIGN PATENT DOCUMENTS

| | | |
|---|---|---|
| CN | 1334565 A | 11/2001 |
| JP | 63-167393 | 10/1988 |
| JP | 4-208091 | 7/1992 |
| JP | 5-282770 | 10/1993 |
| JP | 5-284769 | 10/1993 |
| JP | 8-45175 | 2/1996 |
| JP | 11-53743 | 2/1999 |
| JP | 3065098 | 7/2000 |
| JP | 2001-67779 | 3/2001 |
| JP | 2001-67824 | 3/2001 |
| JP | 2001-155450 | 6/2001 |
| JP | 2001-202690 | 7/2001 |
| JP | 3206385 | 9/2001 |
| JP | 2002-32952 | 1/2002 |
| WO | 00/77785 A1 | 12/2000 |

OTHER PUBLICATIONS

Japanese Office Action for Japanese Patent Application No. 2002–067304, dated Mar. 15, 2005.
Japanese Office Action dated Feb. 3, 2004, for Japanese Patent Application No. 2002–067304, upon which the instant application relies for priority.
Search and Examination Reports, dated Dec. 22, 2003, from the Austrian Patent Office for Patent Application No. 200300024–7.

*Primary Examiner*—David Hudspeth
*Assistant Examiner*—Fred F. Tzeng
(74) *Attorney, Agent, or Firm*—Pillsbury Winthrop Shaw Pittman, LLP

(57) ABSTRACT

In the high-speed seek mode in which priority is given to making the seek operation faster, the CPU sets the driving voltage applied to a motor driver that drives both a spindle motor and voice coil motor to a first driving voltage. Furthermore, in the high-efficiency mode in which priority is given to reducing the power loss in the motor driver, the CPU sets the driving voltage applied to the motor driver to a second driving voltage lower than the first driving voltage.

12 Claims, 9 Drawing Sheets

U.S. PATENT DOCUMENTS

| | | | | |
|---|---|---|---|---|
| 5,307,439 A | * | 4/1994 | Enami | 388/811 |
| 5,406,181 A | * | 4/1995 | Wakui | 318/560 |
| 5,455,496 A | | 10/1995 | Williams et al. | |
| 5,483,399 A | | 1/1996 | Jeong et al. | |
| 5,568,333 A | | 10/1996 | Bang | |
| 5,630,008 A | * | 5/1997 | Okuyama et al. | 388/804 |
| 5,659,762 A | * | 8/1997 | Sawada et al. | 713/323 |
| 5,682,273 A | * | 10/1997 | Hetzler | 360/75 |
| 5,691,948 A | * | 11/1997 | Sakabe | 365/227 |
| 5,701,284 A | * | 12/1997 | Lee | 369/47.44 |
| 5,801,894 A | * | 9/1998 | Boutaghou et al. | 360/72.1 |
| 5,821,717 A | * | 10/1998 | Hassan et al. | 318/560 |
| 5,828,245 A | * | 10/1998 | Brambilla et al. | 327/108 |
| 5,834,913 A | * | 11/1998 | Yoshida et al. | 318/270 |
| 5,978,924 A | * | 11/1999 | Ahn | 713/323 |
| 5,987,613 A | * | 11/1999 | Busch et al. | 713/300 |
| 6,229,664 B1 | | 5/2001 | Albrecht et al. | |
| 6,259,172 B1 | * | 7/2001 | Lee | 307/125 |
| 6,357,013 B1 | * | 3/2002 | Kelly et al. | 713/324 |
| 6,624,962 B1 | * | 9/2003 | Kodama et al. | 360/75 |
| 6,717,763 B2 | * | 4/2004 | Ottesen et al. | 360/75 |
| 6,747,832 B2 | * | 6/2004 | Kisaka et al. | 360/73.03 |

* cited by examiner

POWER SAVING METHOD AND APPARATUS FOR DRIVING A SPINDLE MOTOR AND VOICE COIL MOTOR IN A DISK DRIVE

CROSS-REFERENCE TO RELATED APPLICATIONS

This application is based upon and claims the benefit of priority from the prior Japanese Patent Application No. 2002-067304, filed Mar. 12, 2002, the entire contents of which are incorporated herein by reference.

BACKGROUND OF THE INVENTION

1. Field of the Invention

This invention relates to a disk drive including a spindle motor that rotates a disk and a voice coil motor that acts as a driving source for a head actuator. More particularly, this invention relates to a method of and an apparatus for driving a spindle motor and a voice coil motor in a disk drive.

2. Description of the Related Art

One known typical disk drive that reads the information recorded on a disk serving as a recording medium by means of a head is a hard disk drive (or magnetic disk drive). The hard disk drive uses two types of motor: a spindle motor and a voice coil motor. The spindle motor is a brushless direct-current motor that rotates the disk. The voice coil motor is a driving source for a head actuator that moves the head along the radius of the disk.

A voltage E necessary to drive a brushless direct-current motor, such as a spindle motor, is expressed by the following equation:

$$E = Ee + I \times R \quad (1)$$

In equation (1), Ee is a voltage (hereinafter, referred to as a back EMF voltage) that corresponds to a back electromotive force (back EMF) generated in the motor coil as a result of the rotation of the motor. The back EMF voltage Ee is proportional to the torque constant and the rotational speed. I is the current flowing through the motor coil. R is the sum of the resistance of the motor coil and the resistance of the motor driver. The current I is proportional to the driving torque of the motor. Therefore, for example, when the motor load changes as a result of the change of the ambient temperature, the current I fluctuates accordingly. The torque constant and the coil resistance vary because of the characteristics of the motor. For this reason, the driving voltage of the motor is designed to be higher than E to allow a margin, taking those variations into account.

The margin, however, results in power loss in the motor driver that drives the motor. Thus, when the driving voltage of the motor is designed, allowing for a margin, this causes the problem of increasing the power consumption. This problem particularly becomes significant in fluid dynamics bearing spindle motors which are becoming increasingly popular nowadays as spindle motors used in hard disk motors. The reason is that, in a fluid dynamics bearing spindle motor, the viscosity of fluid (e.g., oil) increases with the ambient temperature and therefore the load on the motor fluctuates significantly. Obviously, a great change in the motor load results in a large fluctuation in the driving voltage E. Thus, it is necessary to allow a large margin for the motor driving voltage actually used, taking a fluctuation in the driving voltage E into account. Allowing a large margin for the motor driving voltage increases the power loss in the motor driver accordingly. A technique for reducing the power loss in a motor driver has been disclosed in Jpn. Pat. Appln. KOKAI Publication No. 4-208091. In the technique written in the publication (hereinafter, referred to as the prior art), the driving voltage (or supply voltage) is changed by a power supply unit capable of changing the voltage. The driving voltage is the voltage necessary for the motor driver to drive the motor. The voltage is varied according to the increase or decrease in the current flowing through the motor coil. By this variable control, the difference between the terminal voltage (or coil terminal voltage) of the motor and the driving voltage is minimized, which reduces the loss in the motor driver.

In a hard disk drive that rotates the spindle motor at high speed, the faster the motor rotates, the higher the driving voltage has to be. Moreover, to drive, for example, a fluid dynamics bearing spindle motor in a severe low-temperature environment, a large driving torque is needed. In this case, a high driving voltage is necessary to drive the spindle motor. To meet this requirement, the following can be considered: the voltage supplied from the host using the hard disk drive is stepped up by a voltage booster and the boosted voltage is used to drive the spindle motor. The method of boosting the voltage has the advantage of being capable of minimizing the loss in the motor drive. The reason is that it is possible to boost the voltage to a value at least necessary to drive the spindle motor at a steady rotational speed and the motor is driven by the boosted voltage. Another advantage of the method of boosting the voltage is that a seek operation of moving the head to the target track on the disk can be performed at high speed. The reason is that the higher the driving voltage, the faster the seek speed can be made by causing a large current to flow through the voice coil motor. Therefore, using a single voltage booster to drive both the spindle motor and the voice coil motor makes it possible to realize the following two properties: one is that the spindle motor can be rotated at high speed or the spindle motor can be driven in a low temperature environment, and the other is that a seek operation can be made faster by the voice coil motor.

However, when the prior art is applied to reduce the loss in the motor driver, a problem arises. Specifically, when the supply voltage is varied according to the voltage necessary to drive the spindle motor, the following problem arises: the driving voltage of the voice coil motor also varies with fluctuations in the spindle motor. Conversely, when the voltage booster steps up the supply voltage to a maximum so as to cause a large current to flow through the voice coil motor, the following problem arises: since the actually used driving voltage becomes larger than the voltage at least necessary to drive the spindle motor, the power loss in the motor driver becomes larger.

BRIEF SUMMARY OF THE INVENTION

An embodiment of the present invention may provide a method of and an apparatus for driving a spindle motor and a voice coil motor in a disk drive which enable the power loss in a motor driver to be reduced, while keeping the seek speed fast, in driving the spindle motor and the voice coil motor.

According to an aspect of the present invention, there is provided a method of driving a spindle motor and a voice coil motor in a disk drive. This method comprises setting a driving voltage applied to a motor driver to a first driving voltage in a first mode (or a high-speed seek mode) and setting the driving voltage applied to the motor driver to a second driving voltage lower than the first driving voltage in a second mode (or a high-efficiency mode). The first mode is a mode in which priority is given to making faster a seek operation of moving a head to a target track on the disk. The second mode is a mode in which priority is given to reducing the power loss in the motor driver. The motor driver drives both the spindle motor and the voice coil motor with the driving voltage applied to the motor driver.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, embodiments of a hard disk drive to which the present invention is applied will be explained.

[First Embodiment]

Figure 1:
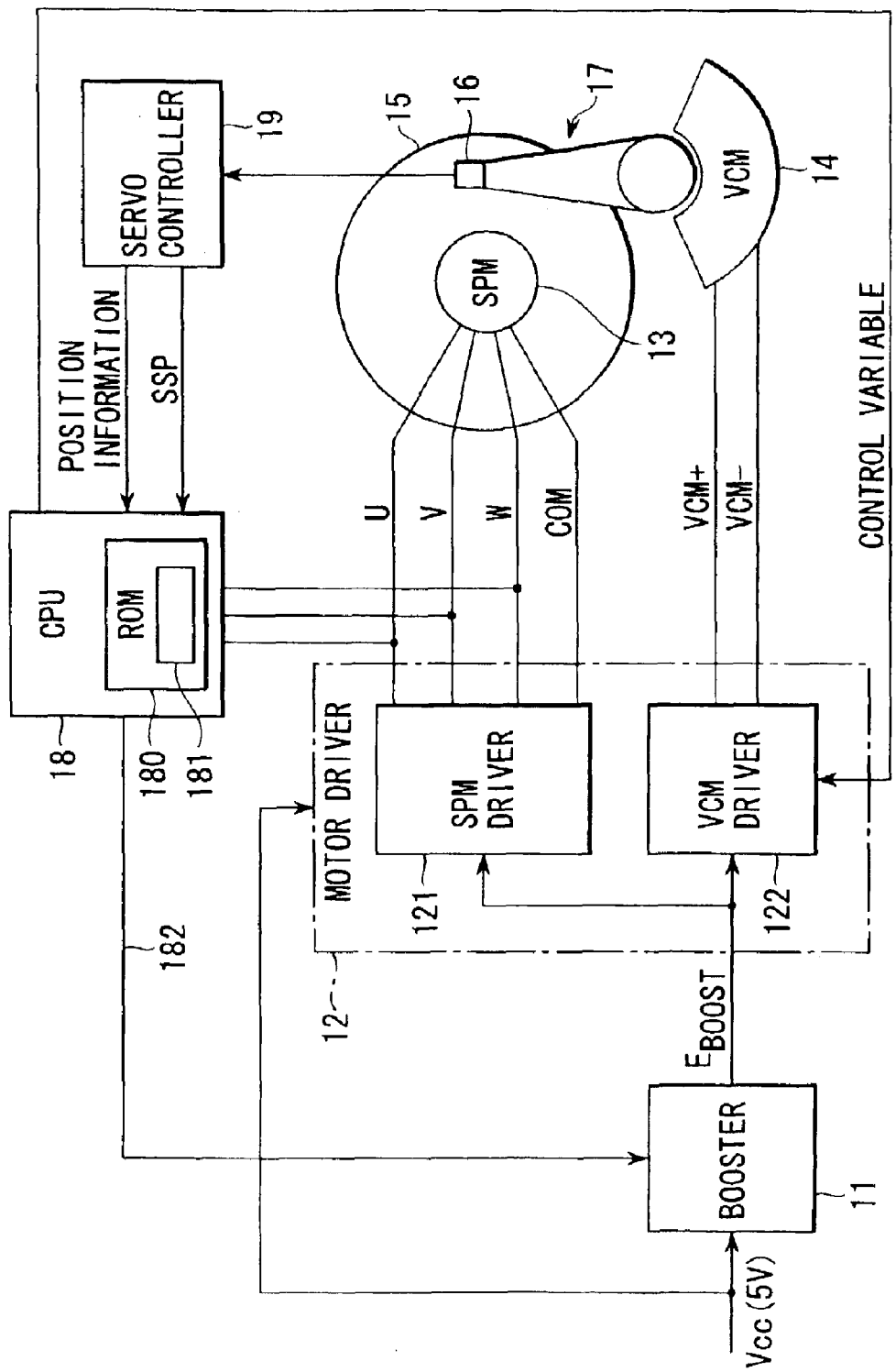
FIG. 1 is a block diagram showing the configuration of a hard disk drive according to a first embodiment of the present invention.

FIG. 1 is a block diagram showing the configuration of a hard disk drive according to a first embodiment of the present invention. The supply voltage for a hard disk drive (hereinafter, referred to as an HDD) of FIG. 1 is, for example, 5 V. The supply voltage Vcc of a host (not shown) using the HDD is used as the supply voltage for the HDD. That is, the host supplies a supply voltage Vcc of 5 V to the HDD. The 5-V supply voltage Vcc is applied to a voltage booster 11. The voltage booster 11 is a power supply unit capable of varying the voltage. Receiving the supply voltage Vcc from the host, the voltage booster 11 steps up (or converts) the voltage Vcc to a voltage $E_{BOOST}$ of a voltage level specified via a signal line 182 by a CPU 18 explained later. The voltage $E_{BOOST}$ is supplied from the voltage booster 11 to a motor driver 12. The supply voltage Vcc is also supplied from the host to the motor driver 12. The supply voltage Vcc from the host is used as the supply voltage for the motor driver 12.

The motor driver 12 includes an SPM (spindle motor) driver 121 and a VCM (voice coil motor) driver 122. The SPM driver 121 drives a spindle motor (hereinafter, referred to as an SPM) 13. The VCM driver 122 drives a voice coil motor (hereinafter, referred to as a VCM) 14. The voltage $E_{BOOST}$ supplied from the voltage booster 11 to the motor driver 12 is used as a driving voltage necessary for the SPM driver 121 and VCM driver 122 in the motor driver 12 to drive the SPM 13 and VCM 14, respectively.

The SPM 13, which is a three-phase brushless direct-current motor, has three phase motor coils. The three phases are generally expressed as U, V, W. One end of each of the three phase motor coils is connected together. In the SPM 13, the terminal to which one end of each of the coils is connected together is referred to as terminal COM. The terminals of the other ends of the three phase motor coils are referred to as terminals U, V, and W, respectively. The SPM 13 rotates a disk 15 serving as a recording medium, at high speed. The VCM 14 forms a driving source for an actuator 17 that supports a head 16. The VCM 14 drives the actuator 17, thereby moving the head 16 along the radius of the disk 15.

On the recording surface of the disk 15, a plurality of servo areas (not shown) are arranged radially along the radius of the disk 15 and discretely at regular intervals in the circumferential direction. In each servo area, servo data is recorded. The servo data is used to move the head to the target track and position the head in a specific range of the target track. The servo data includes a servo mark, a track code (or cylinder number), and a burst signal. The servo mark in the servo data is a unique pattern for identifying the servo data. The track code and burst signal are used as position information for positioning the head 16 in the target range of the target track. More specifically, the track code indicates a track (or cylinder) on which the corresponding servo area is located. In the HDD, seek control is performed in which the head 16 is moved to the target track on the basis of the track code. The burst signal indicates relative position information (or position error) about the head in the track on which the corresponding servo area is located. In the HDD, after seek control is completed, tracking control is performed in which the head 16 is positioned in the target range of the target track.

The head 16 is a transducer used not only for writing (or recoding) data onto the disk 15 but also for reading (reproducing) the data recorded on the disk 15. The very small signal (or read signal) read from the disk 15 by the head 16 is amplified by a read amplifier (not shown). The amplified read signal is binarized by a read/write channel (not shown). The binarized signal is supplied to a servo controller 19. The servo controller 19 detects the servo mark in the servo data from the signal binarized by the read/write channel. The servo controller 19 also detects from the binarized signal the position information (or track code and burst signal) following the detected servo mark. The position information detected by the servo controller 19 is output to the CPU 18. The servo controller 19 generates a pulse (hereinafter, referred to as a servo mark detection pulse) SSP each time the servo mark is detected. The pulse SSP is used as an interrupt signal to the CPU 18.

The CPU 18 includes a nonvolatile memory, such as a ROM 180. In the ROM 180, a control program 181 to be executed by the CPU 18 is stored in advance. The CPU 18 is a controller that realizes the function described below by executing the control program 181. Specifically, the CPU 18 has the function of detecting the terminal voltage $E_{SPM}$ of the SPM 13. The terminal voltage $E_{SPM}$ of the SPM 13 is the voltage between each of the terminals U, V, and W of the SPM 13 and terminal COM. The CPU 18 also has the function of controlling the voltage booster 11 via the signal line 182 according to the increase or decrease in the terminal voltage $E_{SPM}$ of the SPM 13. By this control, the output voltage $E_{BOOST}$ of the voltage booster 11 is varied. The CPU 18 further has the function of performing seek control to move the head 16 to the target track and tracking control (or head positioning control) to position the head 16 in the target range of the target track. The CPU 18 starts a servo interrupt process each time the servo controller 19 outputs a servo mark detection pulse SSP. In the interrupt process, the CPU 18 determines a control variable (or manipulated variable) necessary for seek control or tracking control. The determined control variable is given to the VCM driver 122 in the motor driver 12. The supply voltage Vcc from the host is used as the supply voltage for the CPU 18 and servo controller 19 as with the supply voltage of the motor driver 12.

Figure 2:
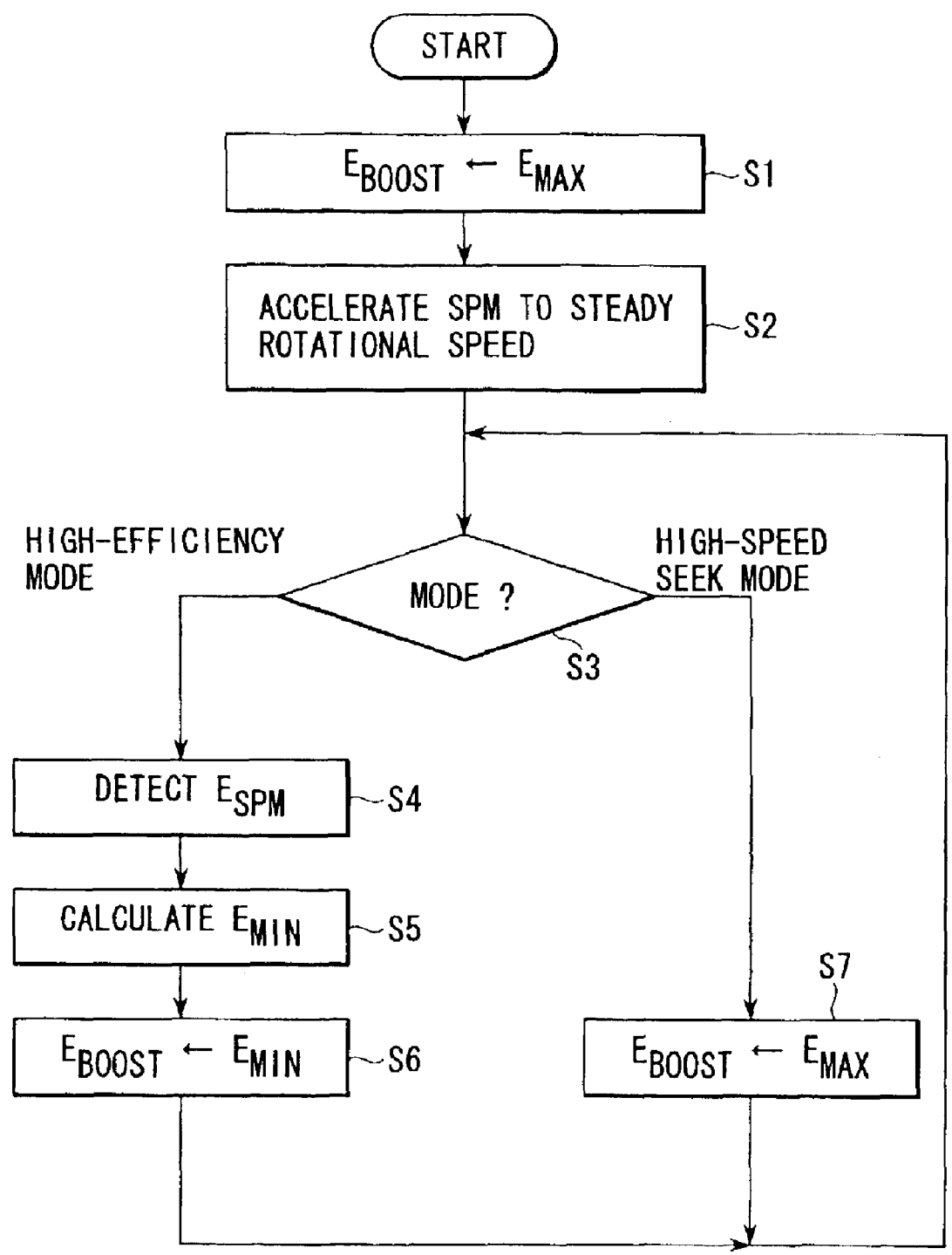
FIG. 2 is a flowchart to help explain the operation of driving the motor in the first embodiment.

Next, the operation of driving the motor in the HDD of FIG. 1 will be explained by reference to a flowchart in FIG. 2. In starting the HDD of FIG. 1, to cause the SPM 13 to reach the steady rotational speed quickly, the voltage booster 11 is controlled as follows. The CPU 18 specifies a voltage $E_{MAX}$ (a first driving voltage) as the voltage level of the output voltage $E_{BOOST}$ via the signal line 182 to the voltage booster 11 (step S1). The voltage $E_{MAX}$ is the maximum voltage to which the voltage booster 11 can step up the voltage. The voltage booster 11 steps up the supply voltage Vcc supplied from the host to the voltage $E_{MAX}$ in response to the instruction given by the CPU 18. That is, the voltage booster 11 sets the output voltage $E_{BOOST}$ of the voltage booster 11 to the voltage $E_{MAX}$.

The output voltage $E_{BOOST}$ (=$E_{MAX}$) of the voltage booster 11 is supplied to the SPM driver 12 and VCM driver 122 in the motor driver 12. The output voltage $E_{BOOST}$ (=$E_{MAX}$) supplied from the voltage booster 11 is used as the driving voltage for the SPM driver 121 and VCM driver 122 to drive the SPM 13 and VCM 14, respectively. Therefore, when the voltage $E_{BOOST}$ is the maximum voltage $E_{MAX}$ (the first driving voltage) as in this example, the motor driver 12 can swiftly drive the SPM 13 at a steady rotational speed (step S2).

When the SPM 13 has reached the steady rotational speed, the CPU 18 controls the voltage booster 11 as described below according to, for example, the mode determined by the instruction given by the host. By this control, the voltage $E_{BOOST}$ (or the driving voltage) supplied from the voltage booster 11 to the SPM driver 121 and VCM driver 122 in the motor driver 12 is varied. There are two modes determined by the instruction given by the host: a high-speed seek mode (a first mode) and a high-efficiency mode (a second mode). The high-efficiency mode is a mode in which priority is given to the reduction of the power consumption in the motor driver 12. In the high-efficiency mode, the output voltage $E_{BOOST}$ of the voltage booster 11 is controlled so as to reduce the power loss in the motor driver 12. On the other hand, the high-speed seek mode is a mode in which priority is given to making faster a seek operation in the seek control period. In the high-speed seek mode, the voltage $E_{BOOST}$ is controlled so as to increase the speed of the VCM 14. The speed of the VCM 14 represents the moving speed (or seek speed) of the head 16 supported by the actuator 17.

The CPU 18 determines whether the HDD is set in either the high-speed mode or the high efficiency mode (step S3). If the HDD is set in the high-efficiency mode, the CPU is first detects the terminal voltage $E_{SPM}$ of the SPM 13 (step S4). Then, the CPU 18 calculates the minimum voltage $E_{MIN}$ (the second driving voltage) necessary to drive the SPM 13 at a steady rotational speed (step S5). In calculating the minimum voltage $E_{MIN}$, a margin $\Delta E$ is used to give a little margin to the voltage $E_{MIN}$. Specifically, the voltage $E_{MIN}$ ($\approx E_{SPM}$) is calculated using the following equation:

$$E_{MIN} = E_{SPM} + \Delta E \quad (2)$$

Instead of detecting the terminal voltage $E_{SPM}$ of the SPM 13, the current (SPM current) flowing through the coil of the SPM 13 may be detected. In this case, the voltage $E_{MIN}$ can be calculated using the following equation:

$$E_{MIN} = Ee + I_{SPM} * R_{SPM} + \Delta E \quad (3)$$

where $R_{SPM}$ is the resistance of the coil of the SPM 13 and Ee is the back EMF voltage generated in the coil as a result of the rotation of the SPM 13. The calculation using equation (3) is affected by a variation in the resistance $R_{SPM}$ of the coil of the SPM 13 and a variation in the back EMF voltage Ee. Therefore, the voltage $E_{MIN}$ calculated according to equation (3) is inferior in accuracy to the voltage $E_{MIN}$ calculated according to equation (2), using the terminal voltage $E_{SPM}$ of the SPM 13.

Next, the CPU 18 controls the voltage booster 11 via the signal line 182 in such a manner that the voltage level of the output voltage $E_{BOOST}$ of the voltage booster 11 becomes the voltage $E_{MIN}$ (step S6). As a result, the output voltage $E_{BOOST}$ of the voltage booster 11 is set to the voltage $E_{MIN}$. Then, the SPM driver 121 uses the minimum voltage $E_{MIN}$ ($E_{MIN} < E_{MAX}$) necessary to drive the SPM 13 at a steady rotational speed as the driving voltage (the second driving voltage) and drives the SPM 13 with the driving voltage. As a result, the power loss in the motor driver 12 can be minimized.

In contrast, when the host specifies the high-speed seek mode (step S3), the CPU 18 controls the voltage booster 11 in such a manner that the voltage level of the output voltage $E_{BOOST}$ of the voltage booster 11 becomes the maximum voltage $E_{MAX}$ (the first driving voltage) (step S7). As a result, the output voltage $E_{BOOST}$ of the voltage booster 11 is set to the voltage $E_{MAX}$. The output voltage $E_{BOOST}$ (=$E_{MAX}$) of the voltage booster 11 is applied to the SPM driver 121 and VCM driver 122 in the motor driver 12. When the voltage $E_{BOOST}$ is the maximum voltage $E_{MAX}$ as in the example, the maximum current (the maximum VCM current) allowed to flow from the VCM driver 122 to the VCM 14 increases. Therefore, the CPU 18 sets the control variable corresponding to the increase in the current in the VCM driver 122, which makes the speed of the VCM 14 faster. This enables a seek operation to be carried out at high speed.

Figure 3:
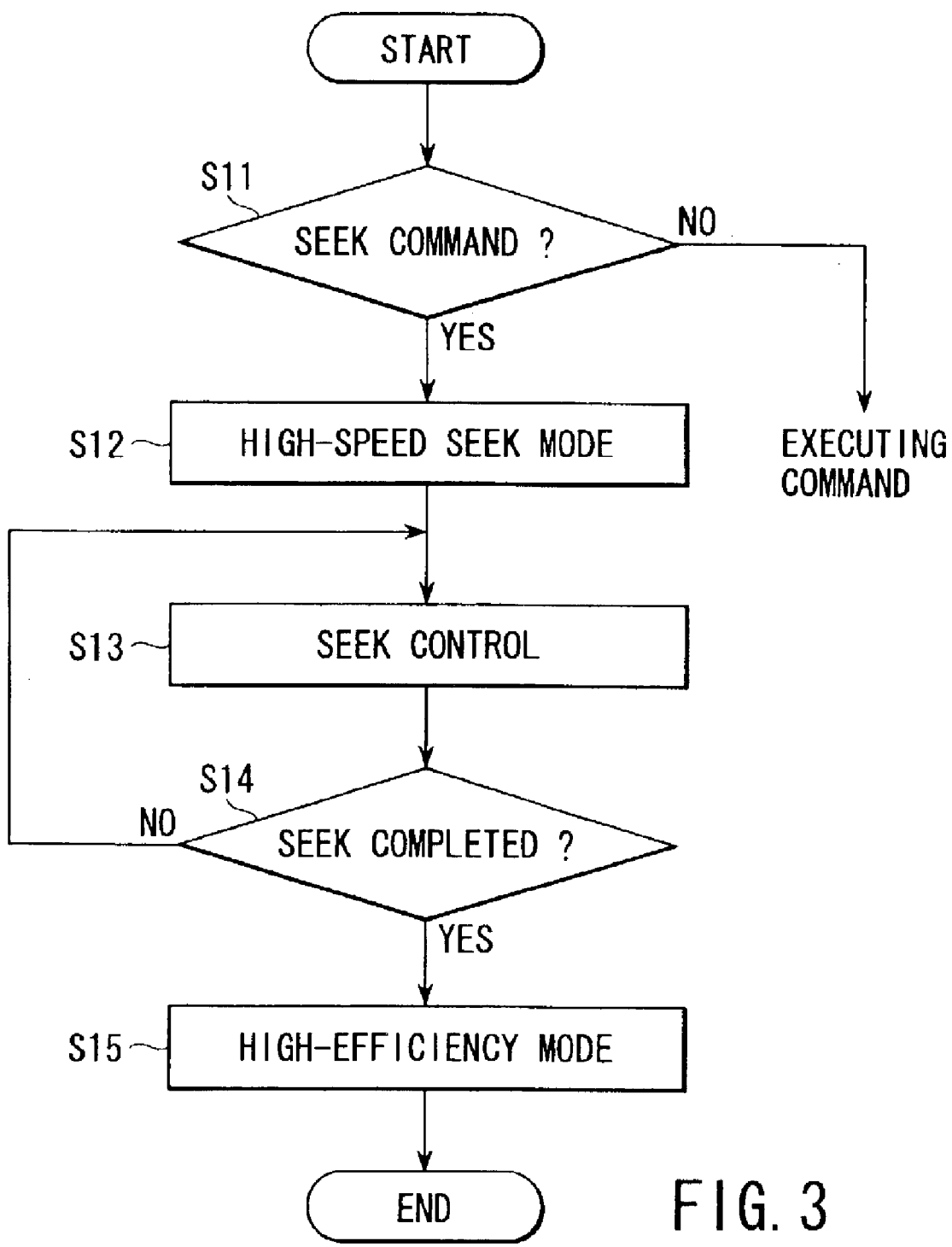
FIG. 3 is a flowchart to help explain the mode setting in the first embodiment.

Next, the mode setting in the HDD of FIG. 1 will be explained by reference to a flowchart in FIG. 3. In the first embodiment of the present invention, when receiving a command from the host, the CPU 18 carries out a process explained below. First, the CPU 18 determines whether the received command is a seek command (a command needing a seek operation) (step S11). If a command other than a seek command is received, the CPU 18 executes the received command.

In contrast, if a seek command is received, the CPU 18 sets the HDD of FIG. 1 in the high-speed seek mode (step S12). Then, the CPU 18 starts seek control to move the head 16 to the track specified by the received seek command (that is, the target track on the disk 15) (step s13). In the period of seek control, the HDD of FIG. 1 is set in the high-speed seek mode. Therefore, in the period of seek control, a seek operation can be carried out at high speed as described above. The CPU 18 continues seek control until the head 16 has reached the target track, that is, until the seek operation is completed (steps S13, S14).

After the seek operation is completed (step S14), the CPU 18 changes the mode of the HDD from the high-speed seek mode to the high-efficiency mode (step S15). In the high-efficiency seek mode, the SPM driver 121 drives the SPM 13, using the voltage $E_{MIN}$ as the driving voltage (the second driving voltage). The voltage $E_{MIN}$ is the minimum voltage necessary for the SPM driver 121 to drive the SPM 13 at a steady rotational speed. Therefore, in the high-efficiency mode, the power loss in the SPM driver 121 (or motor driver 12) can be minimized.

As described above, in the first embodiment of the present invention, the output voltage $E_{BOOST}$ of the voltage booster 11 is set to the maximum voltage $E_{MAX}$ (the first supply voltage) in the period of seek control where high-speed seeking is required. As a result, a high seek speed can be realized. In a period other than the period of seek control (excluding the start-up time of the HDD), the output voltage $E_{BOOST}$ of the voltage booster 11 is set to the voltage $E_{MIN}$ (the second supply voltage) lower than the voltage $E_{MAX}$. This enables the power loss in the motor driver 12 to be reduced. A period other than the period of seek control occupies almost all of the period in which the HDD of FIG. 1 operates. Accordingly, the power loss in the motor driver 12 is reduced remarkably.

[A Modification of the First Embodiment]

Figure 4A:
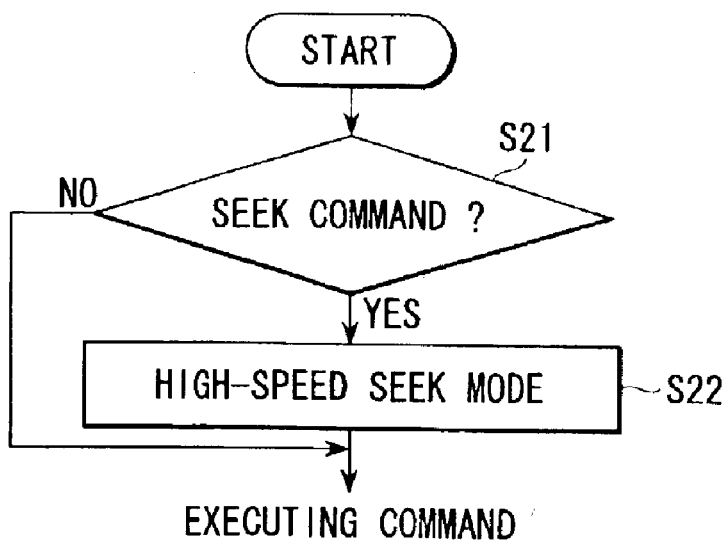
FIGS. 4A and 4B are flowcharts to help explain modifications of the first embodiment.
Figure 4B:
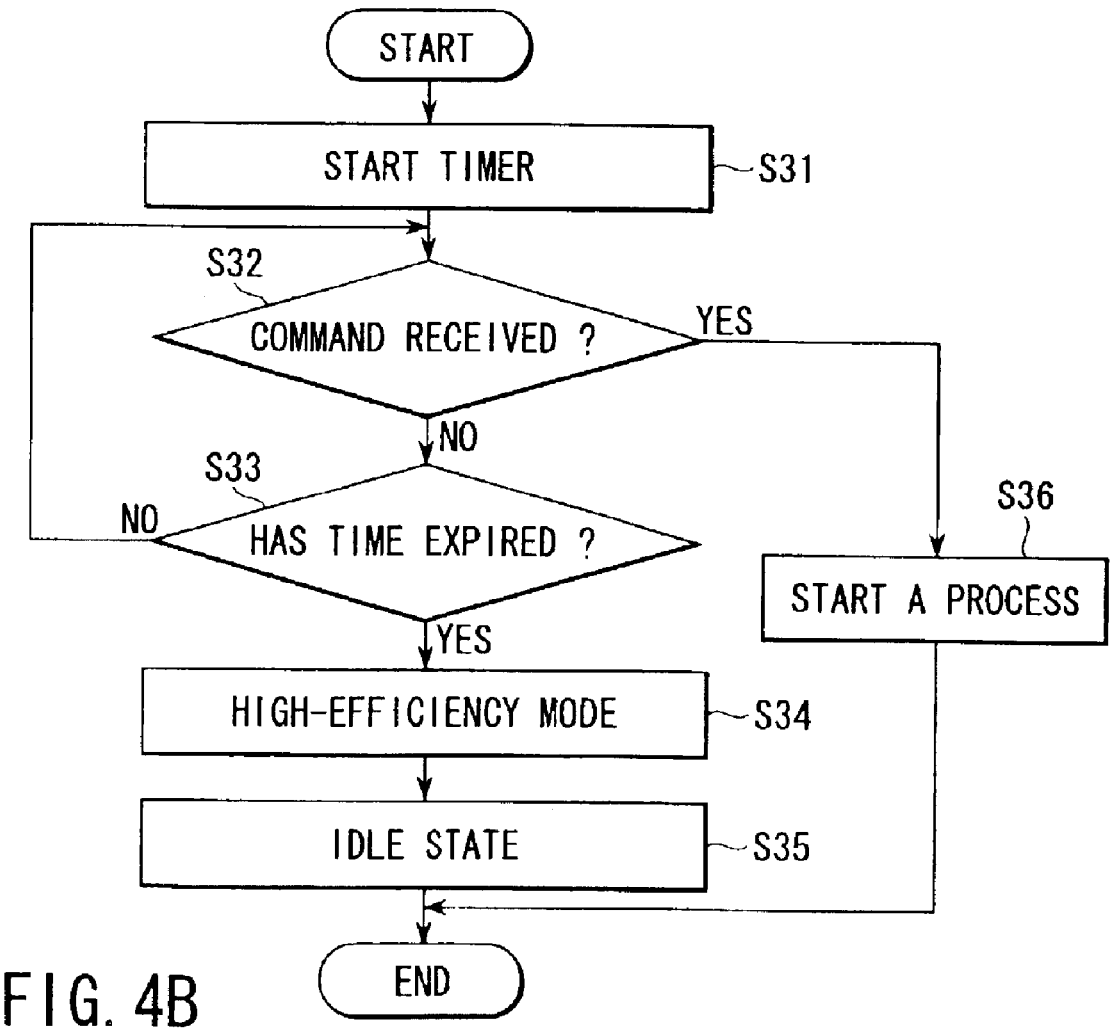

Referring to flowcharts in FIGS. 4A and 4B, a modification of the first embodiment of the present invention will be explained using a case where mode setting is done in a different procedure from that in the flowchart of FIG. 3. First, the CPU 18, receiving a seek command from the host (step S21), sets the HDD of FIG. 1 in the high-speed seek mode (step S22). Thus, the condition for setting the high-speed seek mode is the same as in the flowchart of FIG. 3 (in the first embodiment). What differs from the flowchart of FIG. 3 is the condition for setting the high-efficiency mode as described below.

When having completed the execution of the command specified by the host, the CPU 18 starts a timer (not shown) (step S31). This timer, which is incorporated in, for example, the CPU 18, measures a preset time. After starting the timer, the CPU 18 waits for the next command to be given from the host (step S32). On failing to receive the next command before the timer expires (steps S32, S33), the CPU 18 determines that it was not given a command by the host for a specific length of time. In this case, the CPU 18 sets the HDD of FIG. 1 in the high-efficiency mode (step S34). Then, the CPU 18 brings the HDD of FIG. 1 into the idle state (step S35). The idle state is a state where, when the host makes no request for a specific length of time, the SPM 13 is allowed to keep rotating the disk 15 with the head 16 retracted to a specific retraction place. One known retraction place for the head 16 is, for example, a ramp.

As described above, with the modification of the first embodiment, the voltage booster 11 is controlled in the high-efficiency mode in a period in which the HDD of FIG. 1 is in the idle state (or the idle period). That is, the motor driver 12 is operated in the high-efficiency mode. Then, when the host issues a seek command to the HDD, the mode of the HDD is changed from the high-efficiency mode to the high-speed seek mode. Generally, the non-idle period including the period of seek control is sufficiently shorter than the idle period. Therefore, applying the mode setting according to the flowcharts of FIGS. 4A and 4B enables the power loss in the motor driver 12 in the idle period to be reduced, while keeping the seek speed fast in the period of seek control. In addition, when it is difficult to vary the output voltage $E_{BOOST}$ of the voltage booster 11 at high speed, mode changing conditions different from those in the above example may be used. For example, the high-efficiency mode may be set in the case of battery driving where the power consumption is important and the high-speed seek mode may be set in cases excluding the case of battery driving. In this way, the operation modes may be changed according to use.

[Second Embodiment]

Figure 5:
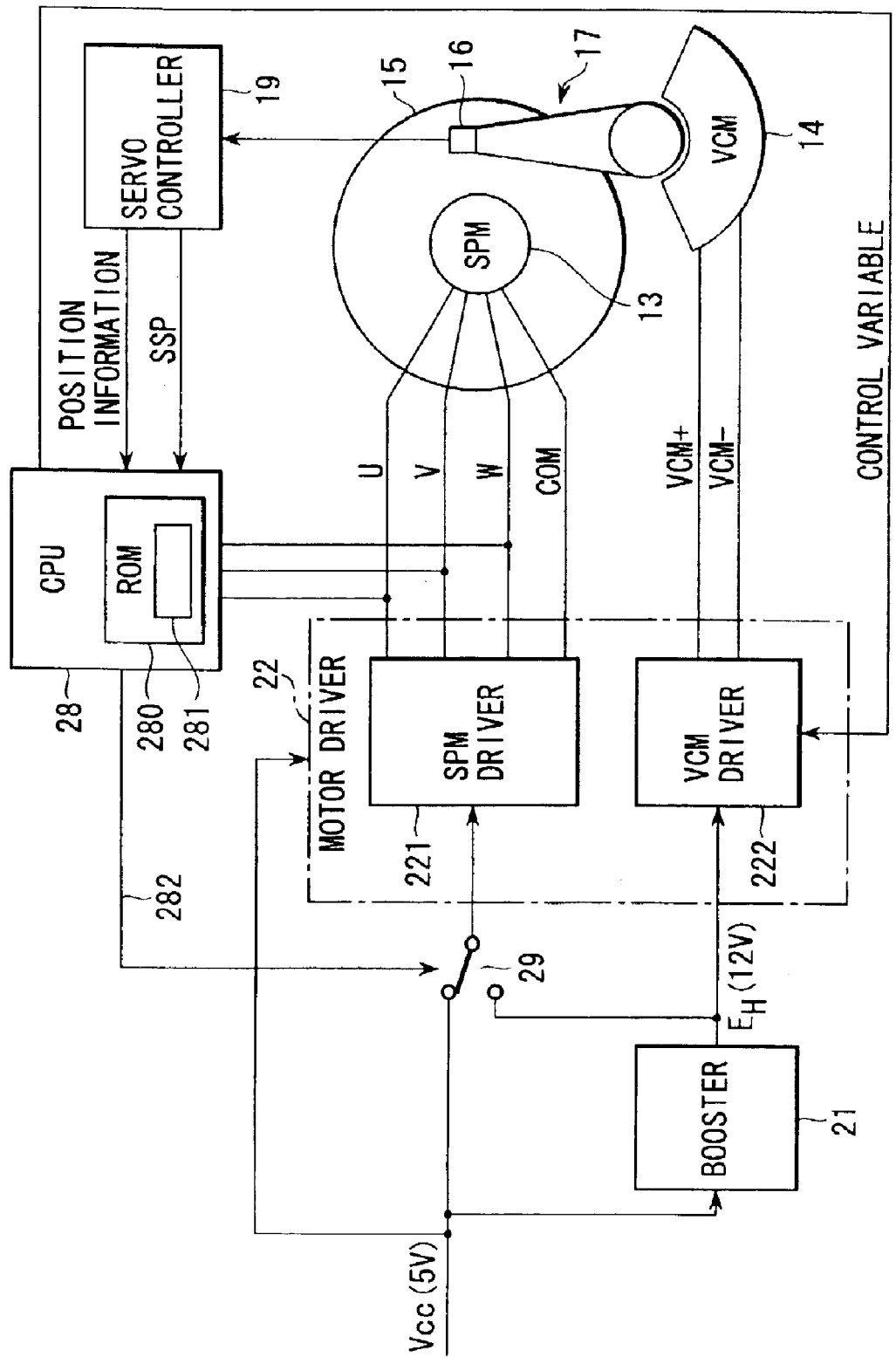
FIG. 5 is a block diagram showing the configuration of a hard disk drive according to a second embodiment of the present invention.

FIG. 5 is a block diagram showing the configuration of an HDD (hard disk drive) according to a second embodiment of the present invention. The same parts as those in FIG. 1 are indicated by the same reference numerals and a detailed explanation of them is omitted. In FIG. 5, the host supplies a 5-V supply voltage Vcc to the HDD as in the first embodiment. The HDD of FIG. 5 includes voltage booster 21. The voltage booster 21 steps up the 5-V supply voltage Vcc supplied from the host to a voltage $E_H$ of a specific voltage level. In the second embodiment, the voltage $E_H$ is 12 V. The 12-V voltage $E_H$, the output voltage of the voltage booster 12, is applied to a VCM driver 222 as a driving voltage for the VCM driver 222 in a motor driver 22 to drive the VCM 14. On the other hand, either the 5-V supply voltage Vcc or the 12-V voltage $E_H$ is applied to an SPM driver 221 in the motor driver 22 via a selector switch 29. The voltage Vcc or voltage $E_H$ applied to the SPM driver 221 is used as a driving voltage for the SPM driver 221 to drive the SPM 13. The selector switch 29 is switched according to a control signal 282 output from a CPU 28. The CPU 28 corresponds to the CPU 18 of FIG. 1. The CPU 28 incorporates a ROM 280 in which a control program 281 is stored in advance. The CPU 28 has the function of detecting the terminal voltage of the SPM 13 as the CPU 18 of FIG. 1 does. The CPU 28 also has the function of switching the driving voltages for the SPM driver 221 to drive the SPM 13 by controlling the switch 29 according to the increase or decrease in the terminal voltage of the SPM 13.

Figure 6:
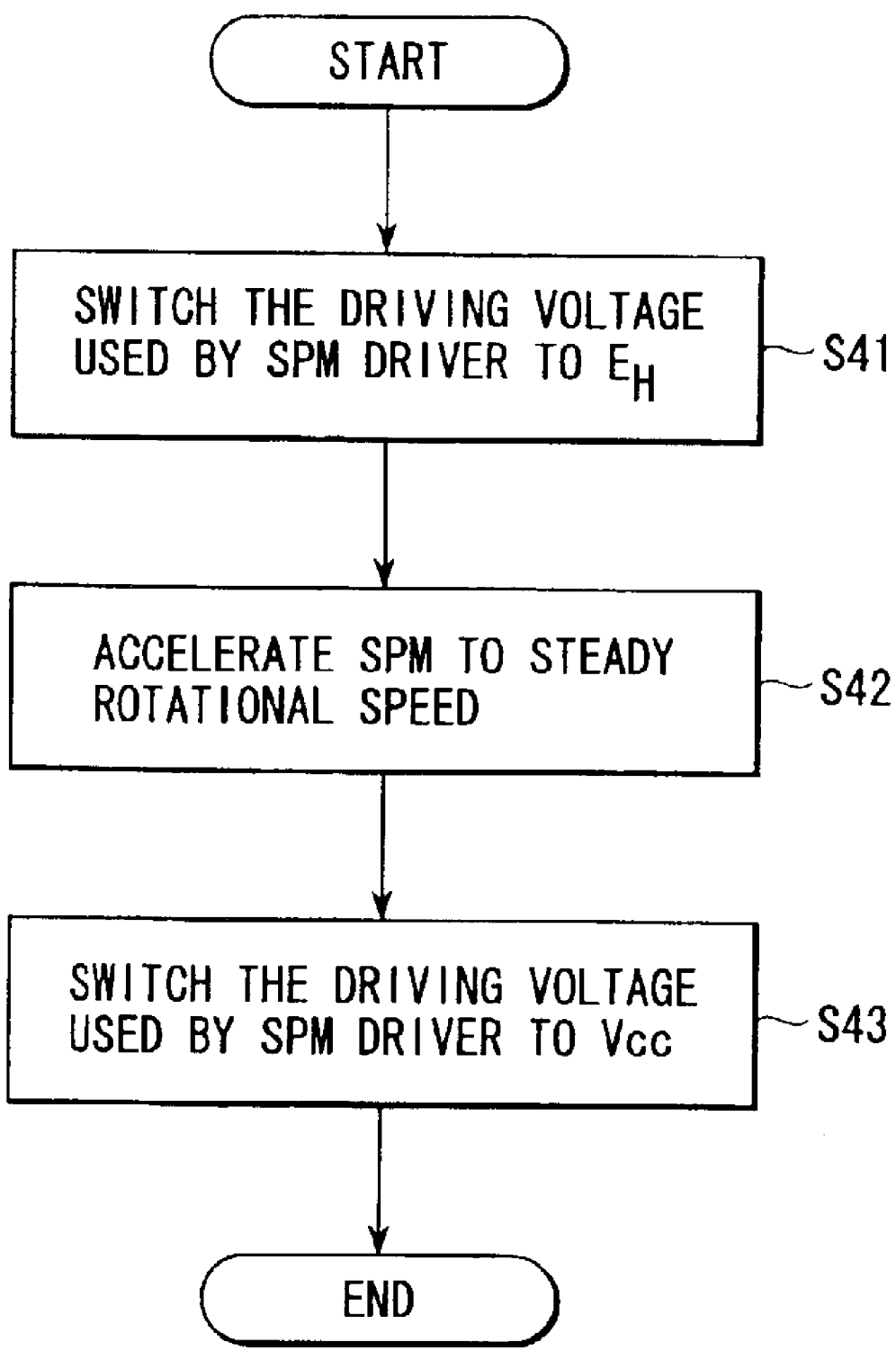
FIG. 6 is a flowchart to help explain the operation of driving the motor in the second embodiment.

Next, the operation of driving the motor in the HDD of FIG. 5 will be explained by reference to a flowchart in FIG. 6. First, in starting the HDD of FIG. 5, to cause the SPM 13 to reach a steady rotational speed quickly, the CPU 28 controls the selector switch 29 as follows. The CPU 28 controls the selector switch 29 with the control signal 282 in such a manner that the driving voltage applied to the SPM driver 221 in the motor driver 22 becomes a voltage $E_H$ of 12 V (step S41). That is, the CPU 28 specifies the 12-V voltage $E_H$ as the driving voltage used by the SPM driver 221. Then, the 12-V voltage $E_H$, the output of the voltage booster 21, is applied via the selector switch 29 to the SPM driver 221. The SPM driver 221 uses the 12-V voltage $E_H$ as a driving voltage for driving the SPM 13. This enables the SPM driver 221 to drive the SPM 13 at the steady rotational speed more quickly than in the case where the 5-V supply voltage Vcc is used as the driving voltage (step S42).

After the SPM 13 reaches the steady rotational speed, the CPU 28 causes the selector switch 29 to switch the driving voltage used by the SPM driver 221 in the motor driver 22 to the 5-V supply voltage Vcc (step S43). On the other hand, the 12-V voltage $E_H$ stepped up by the voltage booster 21 is applied constantly to the VCM driver 222 in the motor driver 22.

As described above, in the second embodiment of the invention, when the HDD (SPM 13) is started, the driving voltage necessary for the SPM driver 221 to drive the SPM 13 is switched to the 12-V voltage $E_H$. This makes it possible to drive the SPM 13 at the steady rotational speed quickly, which shortens the starting time of the SPM 13. On the other hand, the 12-V voltage $E_H$ is always used as the driving voltage necessary for the VCM driver 221 to drive the VCM 14. That is, when the HDD (SPM 13) is started, the 12-V voltage $E_H$ is used as the driving voltage for the SPM driver 221 and VCM driver 222 to drive the SPM 13 and VCM 14, respectively. When the HDD (SPM 13) is stared, the VCM driver 222 need not supply current (VCM current) to the VCM 14. Therefore, the 12-V voltage $E_H$ can be used effectively for the SPM driver 221 to drive the SPM 13.

Furthermore, in a state where the HDD (SPM 13) is started and the SPM 13 is rotating at the steady rotational speed, the SPM 13 does not require a larger current (SPM current) than when it is started up. Therefore, the driving voltage necessary for the SPM driver 221 to drive the SPM 13 can be switched from the 12-V voltage $E_H$ to the 5-V supply voltage Vcc. This switching enables the power loss in the SPM driver 221 to be reduced. On the other hand, the 12-V voltage $E_H$ is always used as the driving voltage necessary for the VCM driver 222 to drive the VCM 14. Therefore, when a seek operation is carried out in a state where the SPM 13 is rotating at the steady rotational speed, the seek speed can be made faster.

[Modification of the Second Embodiment]

In the second embodiment, after the HDD (SPM 13) is started, the 5-V supply voltage Vcc is always used as the driving voltage necessary for the SPM driver 221 to drive the SPM 13. However, when, for example, a fluid dynamics bearing SPM is used as the SPM 13, there is a possibility that the following phenomenon will occur. First, in the fluid dynamics bearing SPM, the motor load varies greatly with the ambient temperature. In this case, the minimum voltage necessary to rotate the SPM 13 steadily can vary and exceed 5 V. In such a state, it is difficult for the SPM driver 221 to drive the SPM 13 at a steady rotational speed on the 5-V supply voltage. That is, even after the SPM 13 is started, when the load on the SPM 13 increases, it may be difficult to drive the SPM 13 at the steady rotational speed on the 5-V supply voltage Vcc.

Figure 7:
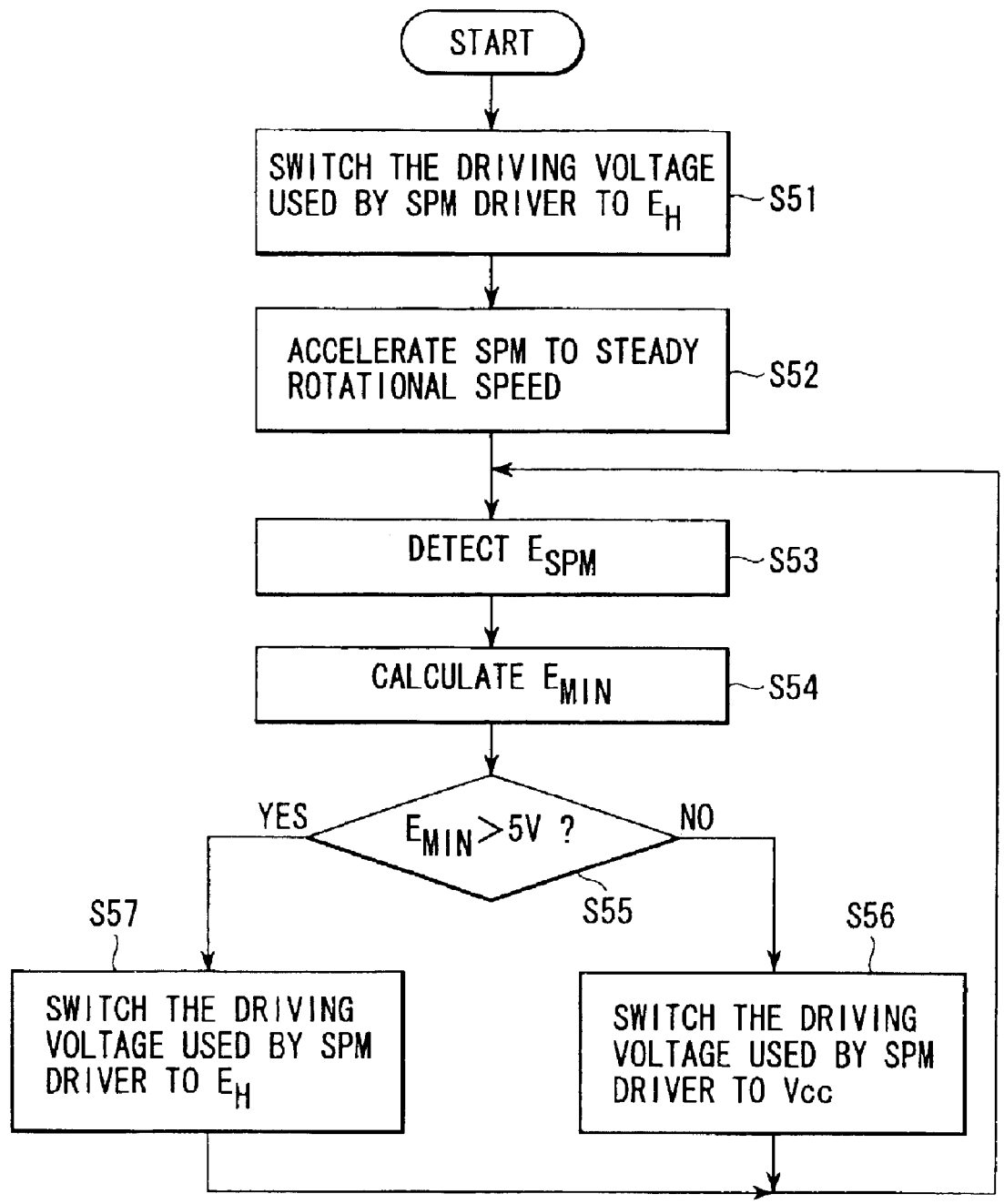
FIG. 7 is a flowchart to help explain a modification of the second embodiment.

To overcome the problem, even if the load on the SPM 13 increases after the HDD (SPM 13) is started, the SPM 13 is made able to be driven at the steady rotational speed in the modification of the second embodiment. A first characteristic of the modification of the second embodiment is that the minimum voltage $E_{MIN}$ necessary to rotate the SPM 13 steadily after the SPM 13 is started is calculated, for example, at regular intervals. A second characteristic of the modification of the second embodiment is that the driving voltages necessary for the SPM driver 221 to drive are switched according to the calculated voltage $E_{MIN}$. Hereinafter, the modification of the second embodiment of the invention will be explained by reference to a flowchart in FIG. 7.

First, in starting the HDD of FIG. 1, to cause the SPM 13 to reach the steady rotational speed quickly, the CPU 28 controls the selector switch 29 as follows. The CPU 28 controls the selector switch 29 with a control signal 282 in such a manner that the driving voltage used by the SPM driver 221 becomes a 12-V voltage $E_H$ (step S51). Then, the 12-V voltage $E_H$ is applied to the SPM driver 221. The SPM driver 221 uses the voltage $E_H$ as the driving voltage and drives the SPM 13. As a result, the SPM driver 221 can drive the SPM 13 at the steady rotational speed more quickly than in the case where the 5-V supply voltage Vcc is used as the driving voltage (step S52).

When the SPM 13 has reached the steady rotational speed, the CPU 28 detects the terminal voltage $E_{SPM}$ of the SPM 13 (step S53). Next, the CPU 28 calculates the minimum voltage $E_{MIN}$ necessary to drive the SPM 13 at the steady rotational speed from the detected terminal voltage $E_{SPM}$ (step S54). Here, the CPU 28 calculates the voltage $E_{MIN}$ in the same manner as in step S5 of the first embodiment (step S54). That is, the CPU 28 calculates the voltage $E_{MIN}$ using equation (2): $E_{MIN}=E_{SPM}+\Delta E$.

Next, the CPU 28 determines whether the calculated minimum voltage $E_{MIN}$ has exceeded 5 V (step S55). If $E_{MIN}$ has not exceeded 5 V, the CPU 28 causes the selector switch 29 to change the driving voltage used by the SPM driver 221 to the 5-V voltage Vcc (step S56). In contrast, if $E_{MIN}$ has exceeded 5 V, the CPU 28 causes the selector switch 29 to change the driving voltage used by the SPM driver 221 to the 12-V voltage $E_H$ (step S57). After the SPM 13 has reached the steady rotational speed, or after the HDD (SPM 13) is started, the CPU 18 repeats the processes, starting from step S53.

In the modification of the second embodiment, the SPM 13 is so designed that the minimum voltage $E_{MIN}$ necessary to drive the SPM 13 is a little lower than 5 V at room temperature. In this example, since the SPM 13 is normally driven with 5 V, the power loss in the SPM driver 221 is small. When the load on the SPM 13 increases and the minimum voltage $E_{MIN}$ necessary to drive the SPM 13 has exceeded 5 V, switching is done to drive the SPM 13 with 12 V. This enables the rotational speed of the SPM 13 to be kept at the steady rotational speed. When a fluid dynamics bearing SPM is used as the SPM 13, the load on the SPM 13 varies greatly with the ambient temperature. The modification of the second embodiment, however, can drive the SPM in a low-temperature environment where the load is large, while preventing the power consumption at room temperature from increasing.

In the second embodiment and its modification, the supply voltage supplied from the host to the HDD of FIG. 5 is only the 5-V supply voltage Vcc. In addition, for example, the host may supply two kinds of supply voltage, 5 V and 12 V, to the HDD. That is, a 5-V power supply and a 12-V power supply may be used. In this case, there is no need to provide the voltage booster 21 in the HDD of FIG. 5. Furthermore, the host may supply only a 12-V supply voltage to the HDD and the 12-V supply voltage may be stepped down to 5 V. In this case, the 12-V supply voltage is supplied directly from the host to the VCM driver 222 and the 12-V supply voltage or the 5-V supply voltage output from a step-down circuit is supplied via the selector switch 29 to the SPM driver 221.

Furthermore, instead of using two power supplies (voltage sources) differing in voltage, or the 12-V power supply and 5-V power supply, two power supplies (current sources) differing in the maximum current they can supply may be used. In this case, a first current source that can supply a larger maximum current may be used in place of the 12-V power supply (the first power supply) and a second current source that can supply a smaller maximum current than the first power supply may be used in place of the 5-V power supply (the second power supply).

[Third Embodiment]

Figure 8:
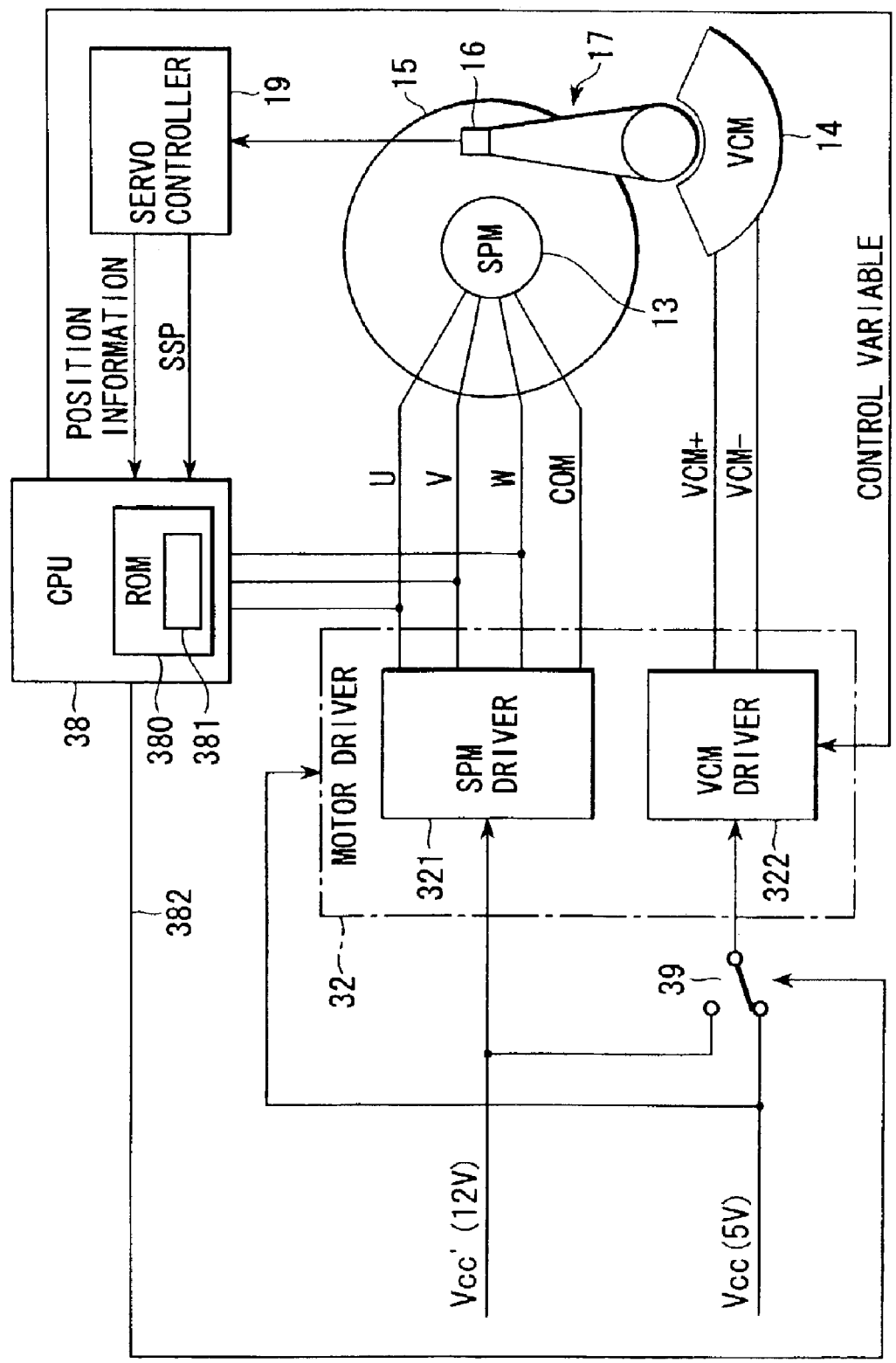
FIG. 8 is a block diagram showing the configuration of a hard disk drive according to a third embodiment of the present invention.

FIG. 8 is a block diagram showing the configuration of an HDD (hard disk drive) according to a third embodiment of the present invention. The same parts as those in FIG. 1 are indicated by the same reference numerals and a detailed explanation of them is omitted. In FIG. 8, the host supplies two kinds of supply voltage Vcc and Vcc', 5 V and 12 V, to the HDD. Of these two kinds of supply voltage Vcc and Vcc', the 12-V supply voltage Vcc' is supplied to the SPM driver 321 in the motor driver 32. The 12-V supply voltage Vcc' is used as a driving voltage necessary for the SPM driver 321 to drive the SPM 13. On the other hand, either the 5-V supply voltage Vcc or the 12-V supply voltage Vcc' is applied via the selector switch 39 to the VCM driver 322 in the motor driver 32. The selector switch 39 is switched according to a control signal 382 output from the CPU 38. The CPU 38 has the function of causing the selector switch 39 to switch the driving voltages used for the VCM driver 322 to drive the VCM 14.

In the HDD of FIG. 8, the maximum current (maximum VCM current) $I_{MAX}$ that the VCM driver 322 in the motor driver 32 can supply to the VCM 14 is:

$$I_{MAX}=(E-Ee)/R \tag{4}$$

where E is the driving voltage applied to the VCM driver 322, that is, E is the driving voltage necessary for the VCM driver 322 to drive the VCM 14, Ee is the back EMF voltage generated in the motor coil (VCM coil) of the VCM 14 as a result of the rotation of the VCM 14, and R is the sum of the resistance of the coil of the VCM 14 and the resistance of the VCM driver 322.

The acceleration produced in the VCM 14 as a result of driving the VCM 14 is equal to the acceleration of the head 16. The reason is that the head 16 is supported by the actuator 17 driven by the VCM 14. The acceleration of the VCM 14 (head 16) is proportional to the current flowing through the coil of the VCM 14. Therefore, the higher the driving voltage E applied to the VCM driver 322, the more the current $I_{MAX}$ allowed to flow through the VCM 14 increases, which enables the seek operation to be carried out at high speed.

On the other hand, the power W necessary to drive the VCM 14 is:

$$W=I_{VCM}*E \tag{5}$$

where $I_{VCM}$ is the current (VCM current) flowing through the VCM 14.

As seen from equation (5), decreasing the current $I_{VCM}$ makes the seek speed slower, which enables the power consumption W to be reduced. Moreover, a decrease in the maximum $I_{MAX}$ causes the driving voltage E to be lowered according to equation (4). A drop in the driving voltage E causes the power consumption W to be reduced according to equation (5). Therefore, the following can be considered: the supply voltage E is changed in such a manner that $I_{MAX}$ coincides with the value obtained by adding a little margin $\Delta I$ to the VCM current $I_{VCM}$ necessary to realize a desired seek speed. In this way, changing the driving voltage E so as to satisfy the equation $I_{MAX}=I_{VCM}+\Delta I$ ($\approx I_{VCM}$) enables the power necessary to drive the VCM 14 to be minimized.

Figure 9:
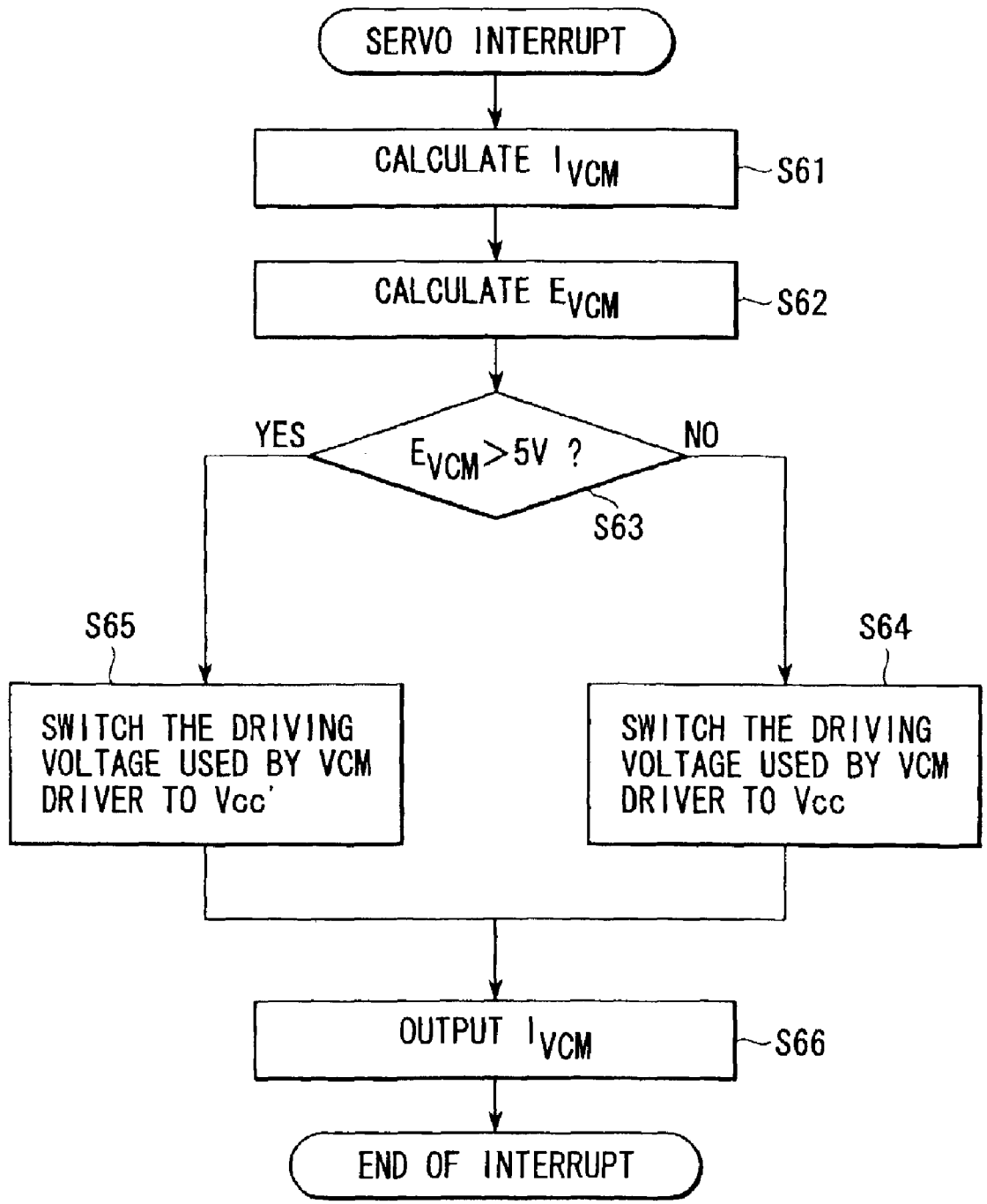
FIG. 9 is a flowchart to help explain the operation of driving the motor in the third embodiment.

Next, the operation of driving the motor in the HDD of FIG. 8 will be explained by reference to a flowchart in FIG. 9. The servo data recorded in each servo area on the disk 15 includes a servo mark. The servo mark in the servo data has a unique pattern for identifying the servo data. The signal read by the head 16 from the disk 15 is amplified by a read amplifier and then is binarized by a read/write channel. The servo controller 19 detects the servo mark in the servo data from the binarized signal. Then, the servo controller 19 detects position information (a track code and a burst signal) following the servo mark and outputs the position information to the CPU 18. Furthermore, the servo controller 19 generates a servo mark detection pulse SSP and outputs it to the CPU 38 each time the servo mark is detected. Each time the servo controller 19 outputs the servo mark detection pulse SSP, the CPU 38 carries out an interrupt process (servo interrupt process) according to the flowchart of FIG. 9 as follows.

First, the CPU 38 calculates the current (VCM current) $I_{VCM}$ flowing through the VCM 14 from the difference between the target position and the head position indicated by the position information output from the servo controller 19 (step S61). Obviously, in seek control for moving the head 16 to the target track, the VCM current $I_{VCM}$ becomes larger. In contrast, in tracking control for positioning the head in the target range of the target track, the VCM current $I_{VCM}$ becomes smaller. The tracking control is performed after the head 16 has reached the target track (that is, after the seek is completed).

After carrying out step S61, the CPU 38 calculates a driving voltage $E_{VCM}$ that can flow the VCM current $I_{VCM}$ calculated in step S61 (step S62). Next, the CPU 38 determines whether the calculated driving voltage $E_{VCM}$ is higher than 5 V (step S63). If the calculated driving voltage $E_{VCM}$ does not exceed 5 V, the CPU 38 switches the driving voltage necessary for the VCM driver 322 to drive the VCM 14 to the 5-V supply voltage Vcc (step S64). The switching is done by controlling the selector switch 39 in the presence of the control signal 382. In contrast, if the calculated driving voltage $E_{VCM}$ is higher than 5 V, the CPU 38 switches the driving voltage necessary for the VCM driver 322 to drive the VCM 14 to the 12-V supply voltage Vcc' (step S65). When executing step 64 or S65, the CPU 38 sets a control variable corresponding to the VCM current $I_{VCM}$ calculated in step S61 in the VCM driver 322. By setting the control variable, the CPU 38 causes the VCM driver 322 to pass the calculated amount of VCM current $I_{VCM}$ through the VCM 14 (step S66).

As described above, in the third embodiment, the CPU 38 changes the driving voltages, depending on whether the VCM 14 is in a state where a larger VCM current has to be caused to flow through the VCM 14 (a first state) or in a state where a smaller VCM current is caused to flow through the VCM 14 (a second state). The first state appears at the time of, for example, seek control. The second state appears at the time of, for example, tracking control. That is, the CPU 38 causes the VCM driver 322 to use the 12-V driving voltage in the first state and use the 5-V driving voltage in the second state. This makes it possible to reduce the power loss in the VCM driver 322 in driving the VCM 14. In the prior art, however, only the control variable set in the VCM driver is changed without changing the driving voltage applied to the VCM driver. Therefore, it is difficult to reduce the power loss in the VCM driver.

While in each embodiment, the present invention has been applied to an HDD (hard disk drive), the invention may be applied to a disk drive other than an HDD, such as a magneto-optical drive, provided that the disk drive includes a spindle motor that rotates a disk and a voice coil motor that acts as a driving source for a head actuator.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of driving a spindle motor that rotates a disk and a voice coil motor that acts as a driving source for a head actuator in a disk drive, the head actuator supporting a head in such a manner that the head can move along the radius of the disk, the method comprising:

setting a driving voltage applied to a motor driver that drives both the spindle motor and the voice coil motor to a first driving voltage in a first mode, the first mode being a mode in which priority is given to making faster a seek operation of moving the head to a target track on the disk, wherein the setting of the first driving voltage includes causing a power supply unit to output the first driving voltage to the motor driver, the power supply unit being capable of varying the voltage level of the driving voltage applied to the motor driver, wherein the first driving voltage is the maximum voltage that the power supply unit can output; and setting a driving voltage applied to the motor driver to a second driving voltage lower than the first driving voltage in a second mode, the second mode being a mode in which priority is given to reducing the power loss in the motor driver, wherein the setting of the second driving voltage includes causing the power supply unit to output the second driving voltage to the motor driver.

2. A method of driving a spindle motor that rotates a disk and a voice coil motor that acts as a driving source for a head actuator in a disk drive, the head actuator supporting a head in such a manner that the head can move along the radius of the disk, the method comprising:

setting a driving voltage applied to a motor driver that drives both the spindle motor and the voice coil motor to a first driving voltage in a first mode, the first mode being a mode in which priority is given to making faster a seek operation of moving the head to a target track on the disk, wherein the setting of the first driving voltage includes causing a power supply unit to output the first driving voltage to the motor driver, the power supply unit being capable of varying the voltage level of the driving voltage applied to the motor driver; and setting a driving voltage applied to the motor driver to a second driving voltage lower than the first driving voltage in a second mode, the second mode being a mode in which priority is given to reducing the power loss in the motor driver, wherein the setting of the second driving voltage includes causing the power supply unit to output the second driving voltage to the motor driver, wherein the second driving voltage is the minimum voltage necessary to drive the spindle motor at a steady rotational speed.

3. The method according to claim 2, further comprising:
detecting the terminal voltage of the spindle motor in the second mode; and
determining the voltage level of the second driving voltage according to the terminal voltage of the spindle motor.

4. The method according to claim 2, further comprising:
detecting the current flowing through the coil of the spindle motor in the second mode; and
determining the voltage level of the second driving voltage according to the current flowing through the coil of the spindle motor.

5. A method of driving a spindle motor that rotates a disk and a voice coil motor that acts as a driving source for a head actuator in a disk drive, the head actuator supporting a head in such a manner that the head can move along the radius of the disk, the method comprising:

selecting a first power supply as a power supply for a spindle motor driver in starting the disk drive, the power supply for the spindle motor driver being used for the spindle motor driver to drive the spindle motor; and switching the power supply for the spindle motor driver from the first power supply to a second power supply with a lower capacity than that of the first power supply, the second power supply also serving as a power supply for a voice coil motor driver, and the power supply for the voice coil motor driver being used for the voice coil motor driver to drive the voice coil motor.

6. A method of driving a spindle motor that rotates a disk in a disk drive, comprising:

setting a driving voltage applied to a spindle motor driver that drives the spindle motor to a first driving voltage in starting the disk drive;

setting a driving voltage applied to the spindle motor driver to a second driving voltage lower than the first driving voltage in an normal operation after the disk drive is started;

detecting a specific state where the spindle motor cannot be driven at a steady rotational speed, after the disk drive is started; and switching the driving voltage applied to the spindle motor driver to the first driving voltage, when the specific state has been detected.

7. The method according to claim 6, wherein the detecting further comprises:

calculating the minimum voltage necessary to drive the spindle motor at a steady rotational speed, on the basis of the terminal voltage of the spindle motor; and determining whether the calculated minimum voltage has exceeded the second driving voltage and, if it is determined that the calculated minimum voltage has exceeded the second driving voltage, regarding the specific state as having been detected.

8. The method according to claim 6, wherein the detecting further comprises:

calculating the minimum voltage necessary to drive the spindle motor at a steady rotational speed, on the basis of the current flowing through the coil of the spindle motor; and determining whether the calculated minimum voltage has exceeded the second driving voltage and, if it is determined that the calculated minimum voltage has exceeded the second driving voltage, regarding the specific state as having been detected.

9. A method of driving a voice coil motor acting as a driving source for a head actuator in a disk drive, the head actuator supporting a head in such a manner that the head can move along the radius of the disk, the method comprising:

calculating the amount of current caused to flow through the voice coil motor, from the position of the head and a target position on the disk, the amount of current being necessary for the voice coil motor to drive the head actuator to position the head at the target position within a desired time; and setting the driving voltage applied to a voice coil motor driver that drives the voice coil motor to either a first driving voltage or a second driving voltage according to the calculated amount of current, the second driving voltage being lower than the first driving voltage.

10. The method according to claim 9, wherein the setting further comprises:

calculating the voltage level of the driving voltage applied to the voice coil motor driver to cause the calculated amount of current to flow from the voice coil motor driver to the voice coil motor;

setting the driving voltage applied to the voice coil motor driver to the first driving voltage, when the calculated voltage level is higher than the second driving voltage; and setting the driving voltage applied to the voice coil motor driver to the second driving voltage, when the calculated voltage level is not higher than the second driving voltage.

11. An apparatus for driving a spindle motor that rotates a disk and a voice coil motor that acts as a driving source for a head actuator in a disk drive, the head actuator supporting a head in such a manner that the head can move alone the radius of the disk, the apparatus comprising:

a spindle motor driver which drives the spindle motor;

a voice coil motor driver which drives the voice coil motor and to which a first driving voltage necessary to drive the voice coil motor is applied;

a switch which switches a driving voltage, necessary to drive the spindle motor and applied to the spindle motor driver, to either the first driving voltage or a second driving voltage lower than the first driving voltage; and a controller which controls the switch in such a manner that the first driving voltage is applied to the spindle motor driver in starting the disk drive and, after the spindle motor reaches a steady rotational speed, the second driving voltage is applied to the spindle motor driver, wherein the controller, after the spindle motor has reached the steady rotational speed, detects a specific state where the spindle motor cannot be driven at the steady rotational speed and, when having detected the specific state, controls the switch in such a manner that the first driving voltage is applied to the spindle motor driver.

12. An apparatus for driving a spindle motor that rotates a disk and a voice coil motor that acts as a driving source for a head actuator in a disk drive, the head actuator supporting a head in such a manner that the head can move along the radius of the disk, the apparatus comprising:

a spindle motor driver which drives the spindle motor and to which a first driving voltage necessary to drive the spindle motor is applied;

a voice coil motor driver which drives the voice coil motor;

a switch which switches a driving voltage, necessary to drive the voice coil motor and applied to the voice coil motor driver, to either the first driving voltage or a second driving voltage lower than the first driving voltage; and a controller which calculates, from the position of the head and a target position on the disk, the amount of current caused to flow through the voice coil motor to position the head in the target position within a desired time by driving the head actuator with the voice coil motor and which controls the switch according to the calculated amount of current.

* * * * *